United States Patent [19]

Maruyama et al.

[11] 4,264,743

[45] Apr. 28, 1981

[54] POLYURETHANE FOAM SEALING MATERIAL AND PROCESS FOR PRODUCING THE SAME

[75] Inventors: Takao Maruyama; Koichi Kusakawa; Toshiaki Kimura; Noboru Murata, all of Yokohama, Japan

[73] Assignee: NHK Spring Co., Ltd., Yokohama, Japan

[21] Appl. No.: 32,426

[22] Filed: Apr. 23, 1979

[51] Int. Cl.$^3$ .................. C08G 18/14; C08G 18/36; C08G 18/00
[52] U.S. Cl. .................................. 521/101; 521/112; 521/132; 521/137; 521/172; 521/173
[58] Field of Search ............... 521/101, 112, 137, 172, 521/173

[56] References Cited

U.S. PATENT DOCUMENTS

| | | | |
|---|---|---|---|
| 2,984,679 | 5/1961 | Ehrlich et al. | 521/172 |
| 3,201,359 | 8/1965 | Herrick et al. | 521/132 |
| 3,356,621 | 12/1967 | Hopkins et al. | 521/172 |
| 3,748,288 | 7/1973 | Winkler et al. | 521/132 |

FOREIGN PATENT DOCUMENTS 848766 9/1960 United Kingdom .

OTHER PUBLICATIONS

Mitsui Petrochemical Industries, Ltd. Data Sheet on "Mitsui FTR 6100", Apr. 11, 1978.
Nippon Petrochemicals Co., Ltd. Data Sheet on "Nisseki Hisol SAS".
ASTM Std., D737-75-Air Permeability of Textile Fabrics, pp. 114-118.
JIS L-1004 (1972), Testing Methods for Cotton Fabrics (32 pp.).

Primary Examiner—H. S. Cockeram
Attorney, Agent, or Firm—Sughrue, Rothwell, Mion, Zinn and Macpeak

[57] ABSTRACT

A flexible or semi-rigid open-cell, polyurethane foam sealing material prepared from a polyisocyanate and a polyol component, a major portion of said polyol component consisting of a polyol derived from a dimer acid or castor oil, castor oil, or a mixture thereof in the presence of a blowing agent, a foam stabilizer, a catalyst, and, optionally, a lipophilic filler.

11 Claims, No Drawings

POLYURETHANE FOAM SEALING MATERIAL AND PROCESS FOR PRODUCING THE SAME

BACKGROUND OF THE INVENTION

The present invention relates to a flexible or semi-rigid, open-cell, polyurethane foam sealing material prepared from a polyisocyanate and a polyol component a major portion of which consists of a polyol derived from a dimer acid or castor oil, castor oil, or a mixture thereof in the presence of a blowing agent, a foam stabilizer, a catalyst and, as required, a lipophilic filler, and having an air permeability of 10 cc/cm²/sec or less at 10 mm thick, and a process for producing the same.

The sealing material obtained according to the process of the present invention has a number of advantages: excellent waterproofness without incorporation of any waterproofing filler; low temperature sensitivity, i.e. no tendency to become badly soft and flabby even in summer; little change in stiffness depending on compression ratio; and easy handling with no tack and without contaminating the substrates to be applied. The manufacturing method is also easy; the lipophilic filler, if desired, can be incorporated in the product simply by formulating it in the foaming compound. This eliminates the need for troublesome after-treatments required in conventional processes, such as subsequent impregnation of waterproofing agents, or subsequent lamination or formation of a film on the product surface. Any desired shape can be easily obtained by cutting the foamed product. These are excellent features of the present invention not expected in conventional processes.

The polyurethane foam has been changed from the polyester type, which was the mainstream at its earlier stage of development, to the polyether type. Particularly, in terms of higher moisture absorption, antistatic property and higher productivity through increased rate of reaction, desired in its application to cushioning materials, such as mattresses, addition polymers, such as polypropylene oxide and polypropylenethylene oxide, are commonly used in recent years as the base material. This shows a tendency toward higher hydrophilicity, the reverse of waterproofing characteristics.

Such hydrophilic polyurethane foams, if not treated otherwise, cannot prevent water leaks (1) even in the compressed state, (2) even if the air permeability is reduced near zero, or (3) even at low water pressures.

In order to use these hydrophilic polyurethane foams as a waterproofing material, many attempts have been made. The only way heretofore available to render them waterproof is to impregnate a waterproofing agent into the foamed products previously prepared in an aftertreatment. As typical examples of this process and waterproofing agents used, may be mentioned the following.

Polyurethane foams in which a waterproofing agent is used, such as asphalt, polybutene and low molecular-weight butyl rubber, are well known.

These polyurethane foam sealing materials are produced, for example, by the following methods:

(1) An open-cell polyurethane foam is cut to an appropriate size, impregnated with a solution of asphalt in a volatile solvent, and dried.

(2) Instead of the asphalt solution used above, an aqueous suspension of asphalt is employed.

These methods include the troublesome impregnation and drying steps, reducing the productivity. In addition, uniform and thorough impregnation of asphalt into the material cannot be achieved when the cell size and air permeability are not sufficiently large or when the thickness of the foam material is large.

Method (1) requires a large amount of volatile solvent to dissolve asphalt. This may cause air pollution problems, various harms to human bodies, and fire hazards. Other difficulties involved in this method are: the long time required for drying; low productivity; tacky feeling of the product and contamination of the substrates to which the product is applied; and high temperature sensitivity of the product, i.e. reduced stiffness in summer and lower recovery speed after compression.

In method (2), the disadvantages of method (1) caused by the use of a volatile solvent have been overcome. However, this method suffers from the following difficulties: a long drying time and low productivity; and the use of an emulsifier to disperse asphalt in water, which will remain in the product after drying and lower its waterproofness when in contact with water.

Other methods for producing polyurethane foams incorporating a bituminous substance, such as asphalt and petroleum pitch, are also known: for sealing applications, (1) a liquid mixture comprising a polyester polyol and/or a polyether polyol, an isocyanate, asphalt and a blowing agent, etc., is foamed-in-place in joints (Japanese Patent Publication No. 1672, 1965), (2) a mixture comprising a polyester polyol or polyether polyol, a bituminous substance, an isocyanate and a blowing agent, etc., is poured in a mold, wherein a sheet or film is placed on the surface before foaming begins to form an integral waterproofing skin layer (Japanese Patent Publication No. 1673, 1965); and (3) a first component comprising a polyester polyol or polyether polyol, a bituminous substance, a volatile organic solvent, a surfactant etc., and a second component comprising an organic polyisocyanate are mixed and foamed-in-place (Japanese Patent Publication No. 17598, 1968).

All these processes are intended merely to fill cavities with the polyurethane foaming materials or to achieve waterproofness by utilizing the skin layer.

As examples of polyurethane foam materials containing a bituminous substance intended for applications other than as sealing materials, may be mentioned: (4) a method of manufacturing building construction members to which a foaming material admixed with a softening agent, such as animal, vegetable or mineral oil, is sprayed in place (Japanese Patent Publication No. 21133, 1964); and (5) heat insulating materials with improved weather resistance incorporating petroleum pitch (Japanese Patent Publication No. 34117, 1971).

Furthermore, British Pat. No. 848,766 discloses, as an elastomer, polyurethane foams incorporating a bituminous substance, such as asphalt and petroleum pitch. However, these polyurethane foams are either closed-cell foams, or open-cell foams in which a non-foaming polyurethane elastomer is coated on the surface or a skin layer is formed by melting to form a waterproofing outer layer. The latter open-cell type structure requires after-treatments and its waterproofness will be lost when the outer protective layer is broken.

The present invention is intended to offer a polyurethane foam sealing material free from the disadvantages of conventional ones mentioned above.

SUMMARY OF THE INVENTION

An object of the present invention is to offer an open-cell, polyurethane foam sealing material having excellent waterproofness without incorporation of any waterproofing filler.

The second object of the present invention is to offer an open-cell, polyurethane foam sealing material having excellent waterproofness, in which a waterproofing filler, (referred to as a "lipophilic" filler as used in the present invention) if used, can be incorporated by blending it with the foaming compound prior to foaming process, instead of impregnation into the foamed product by using a volatile solvent.

The third object of the present invention is to offer a polyurethane foam sealing material having excellent waterproofness, in which an emulsifier for dispersing waterproofing agents in water is not necessary, thus eliminating bad effects of such emulsifier remaining in the foamed product on the waterproofing characteristics.

The fourth object of the present invention is to offer a polyurethane foam sealing material having excellent waterproofness, which is free from such troubles as tackiness in handling and contamination of the substrates to which it is applied.

The fifth object of the present invention is to offer a polyurethane foam sealing material having excellent waterproofness and low temperature sensitivity, with little drop in stiffness even in summer.

The sixth object of the present invention is to offer a polyurethane foam sealing material having excellent waterproofness and a high rate of restoration after compression.

The seventh object of the present invention is to offer an open-cell, polyurethane foam sealing material which can be prepared by one step without any after-treatment.

The eighth object of the present invention is to offer a polyurethane foam sealing material having excellent waterproofness, in which only a slight change in stiffness and waterproofness is observed at different compression ratio.

The ninth object of the present invention is to offer a polyurethane foam sealing material which is adaptable to possible variations in cavity size to which it is to be applied without modifying its shape.

The tenth object of the present invention is to offer a versatile sealing material applicable to various assembly products such as automobiles, refrigerators and prefabricated houses.

The present inventions have been accomplished to effect these objects. It has generally been accepted that polyurethane foams are hydrophilic in nature because of the urethane, urea, and ether or ester groups contained. Our studies have revealed that the waterproofness of a polyurethane foam depends greatly on the contact angle between the foam and water as well as its air permeability, and that extremely excellent waterproofness is obtained if the contact angle is about 90° or more and the air permeability at 10 mm thick is 10 $cc/cm^2/sec$ or less. It has also been demonstrated that the contact angle is determined mainly by (1) the type of polyol used, (2) the type and amount of lipophilic filler added, and (3) the type and amount of foam surfactant used.

It was found that the contact angle increases and waterproofness is enhanced with increasing lipophilicity of the polyol used; a contact angle of 90° or more can be obtained if, among a number of polyols available, a polyol derived from a dimer acid or castor oil, castor oil or a mixture thereof is used, producing excellent sealing materials without using any lipophilic filler.

It was also found that if the above mentioned polyols are employed, lipophilic fillers can easily be incorporated into the foamed products by direct blending with the foaming compound, instead of impregnation by after-treatment.

The present invention has been accomplished based on the above-mentioned findings.

DETAILED DESCRIPTION OF THE INVENTION

The present invention relates to a flexible open-cell, polyurethane foam sealing material prepared from a polyisocyanate and a polyol component a major portion of which consists of a polyol derived from a dimer acid or castor oil, castor oil, or a mixture thereof in the presence of a blowing agent, a foam stabilizer and a catalyst and having an air permeability of 10 $cc/cm^2/sec$ or less for a 10 mm thickness, and the process for producing the same; and a flexible or semi-rigid, polyurethane foam sealing material prepared from a polyisocyanate and a polyol component consisting mainly of a polyol derived from a dimer acid or castor oil, castor oil, or a mixture thereof in the presence of a lipophilic filler and having an air permeability of 10 $cc/cm^2/sec$ or less at a 10 mm thickness and the process of producing the same.

The dimer acid is a dicarboxylic acid prepared by dimerization of a monobasic fatty acid (generally having a carbon number of 18) through carbon-carbon covalent bonds, whose molecular weight is just twice that of the starting material. A typical example is those prepared by heating linoleic acid and oleic acid, the dimer acid of which has the following structural formula:

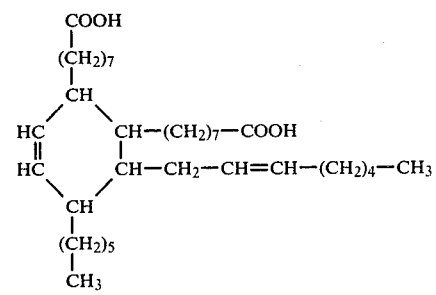

The commercial dimer acid product contains, other than the dimer acid, monobasic acids, tribasic acids and high polymeric acids as impurities. Such a dimer containing other acids of different functionalities can also be used in the present invention.

As examples of polyols derived from dimer acid, may be mentioned, among others; dimer acid polyesters prepared by the reaction of a dimer acid with a lower diol, triol or polyol; reaction products of a dimer acid with a polyoxy alkylene glycol, polyoxyalkylene triol or higher triol; reaction products of a mixture of a dimer acid and other polycarboxylic acids, such as adipic acid, with a diol, triol or polyol mentioned above; and reaction products of dimer acid with an alkylene oxide; and a mixture thereof.

As examples of polyols derived from castor oil, may be mentioned, among others, castor oil polyesters; polyesters obtained from reaction of castor oil and polycarboxylic acids, such as adipic acid dimer acid; polyesters prepared from castor oil, other polycarboxylic acids, and a lower polyol, such as ethylene glycol, diethylene glycol, 1,4-butanediol and glycerol; additional products of castor oil with an alkylene oxide, such as ethylene oxide, propylene oxide and butylene oxide; and an alkylene oxide addition product of a castor oil ester and a mixture thereof.

When using a reaction product of dimer acid with a lower diol, triol or polyol, an addition product of dimer acid with an alkylene oxide, or a polyesterether polyol prepared by the reaction of two of the above, its number average molecular weight must be about 600 to 10,000, preferably about 600 to 5000. When using, a castor oil a reaction product of castor oil with an alkylene oxide, a reaction product of castor oil with a polycarboxylic acid and, if desired, a diol or a triol, or a polyetherester compound prepared by the reaction of two of the above, its number average molecular weight must be about 600 to 10,000, preferably about 600 to 5000. The castor oil referred to in the present invention generally means the commercial grade triglyceride between glycerol and ricinoleic acid. But, the diglyceride prepared from glycerol and ricinoleic acid and the like may also be used in the present invention.

The average functionality of the polyols deriverd from dimer acid must be 1.6 to 4.0, preferably 1.9 to 3.0, per molecule. The preferable average functionality of castor oil and the polyols derived from castor oil is 3.0 to 4.0. In the manufacture of polyurethane foams from a polyol derived from a dimer acid or castor oil, castor oil, or a mixture thereof according to the process of the present invention, a polyol used for the production of conventional hydrophilic polyurethane foams may be employed as part of the polyol component.

As examples of organic polyisocyanates used in the present invention, may be mentioned, among others, tolylene diisocyanate, polymethylenepolyphenylene polyisocyanate, hexamethylene diisocyanate, 1,5-naphthylene diisocyanate, xylylene diisocyanate, hydrogenated polymethylenepolyphenylene polyisocyanate, and mixtures thereof. It is preferable, however, to use a polymethylenepolyphenylene diisocyanate or a mixture thereof with tolylene diisocyanate in order to obtain foams of smaller cell size with reduced air permeability and enhanced waterproofness.

The lipophilic filler used in the present invention include among others a substance consisting substantially of hydrocarbons and having a melting or softening point of 150° C. or lower and a boiling point of 200° C. or higher at atmospheric pressure, such as parafine, waxes, coal tar, asphalt, and petroleum resins, and the like prepared by polymerizing a $C_4$-$C_9$ cut obtained as a byproduct in naphtha cracking, polybutene, low molecular weight butyl rubber, dicarboxylic acid diesters, oils such as extender oil, and animal or vegetable oils.

Silicone surfactants are preferable as the foam stabilizer. However, it should be noticed that the waterproofness of foamed products obtained is greatly influenced by the type of silicone surfactant used. The silicone foam surfactants commonly used in the manufacture of conventional flexible polyurethane foams are polydimethylsiloxane-polyoxyalkyleneglycol block copolymers in which the terminal hydroxyl groups are capped with acetyl, methoxy, ethoxy or butoxy radical.

It was foam that such type of silicone surfactants tend to lower the hydrophobic nature of polyurethanes and lead to reduction in the waterproofness, especially in a long term of the product.

It has been found from our study that, among a number of polydimethylsiloxanes grafted with a polyether polyol, only those having at least one hydrogen radical in the terminal polyether group or those having the following structural formula display better waterproofness compared with other types of silicone compounds.

wherein R represents an alkyl group such as methyl, ethyl and butyl or an aryl group such as phenyl, and X denotes 0 or a positive integer.

As typical examples of hydroxyl-containing organic silicon compounds may be mentioned:

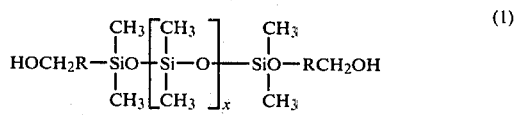

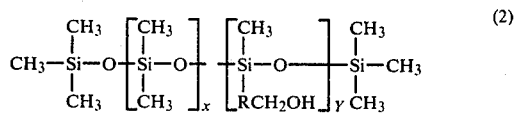

wherein R represents a divalent organic radical

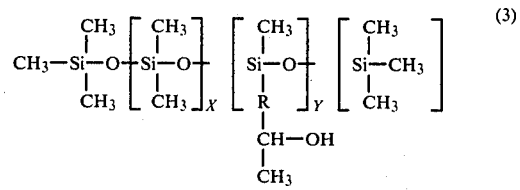

where R represents a divalent organic radical

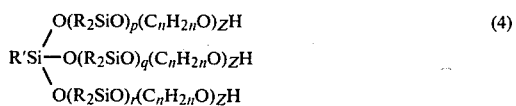

wherein R and R' are alkyl radical having a carbon number of 1 to 4, and n is an integer of 2 to 4.

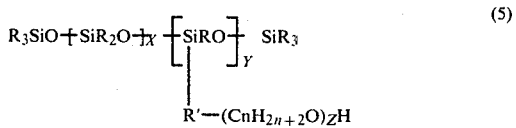

wherein R represents alkyl radical having a carbon number of 1 to 4, R' is a divalent organic radical, and n denotes an integer of 2 to 4.

In all the formulas shown above, X, Y, p, q, r, and Z denote integers of 0 to 100, or more.

Specific illustrative examples of silicone foam surfactant used in the present invention include

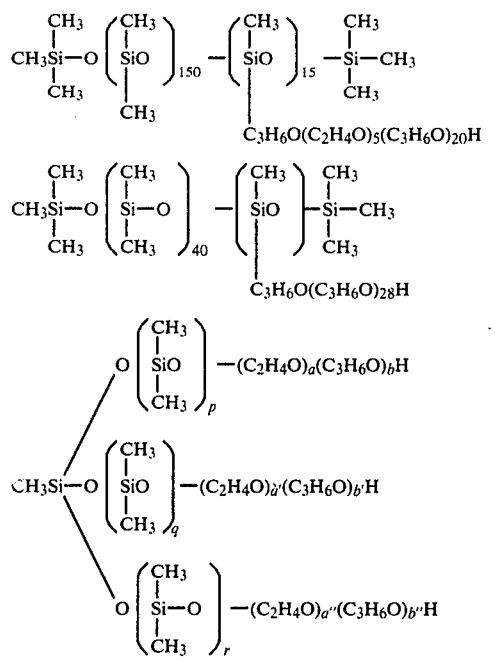

wherein $p+q+r=30$, $a+a'+a''=7$, and $b+b'+b''=13$.

The preferable viscosity of the organosilicon compounds free from hydroxyl groups (silicone oil) used in the present invention is 5 to 10,000 centistokes at 25° C. The preferable amount of foam stabilizer used is 0.1 to 10 weight % of the total foaming mixture regardless of the type of compound employed.

The reason why the selected type of silicone as defined above is effective is unclear at present. It is presumed, however, that the surfactant with its polyether terminal hydroxy groups capped with acetyl, methoxy, ethoxy on butoxy radical remains unchanged in the foamed product and lowers the waterproofness through its hydrophilic nature, while the silicone surfactant hydroxyl groups in the terminal reacts with the isocyanate group and fixed to the polyurethane chain, thus increasing its hydrophobic nature in the final product. On the other hand, the polysiloxane not grafted with polyether polyol (silicon oil) is hydrophobic in nature and serves to enhance the waterproofness of the foamed product.

The organo silicon surfactant having hydroxyl groups may used by reacting, in advance, with excess polyisocyanate before mixing with other components.

As the catalyst, tertiary amines and organotin compounds may be preferably used. Illustrative examples include triethylenediamine, triethylamine, N-methylmorpholine, N-ethylmorpholine, N,N,N'N'-tetramethylbutanediamine, stannous octoate, and dibutyltin dilaurate.

As examples of the blowing agent used in the present invention, there may be mentioned, among others, water; halogenated alkanes such as monofluorotrichloromethane and dichloromethane; low boiling alkanes such as butane and pentane; and compounds capable of producing gases, e.g. nitrogen gas, through decomposition, such as azobisisobutyronitrile.

Other than the main components mentioned above, substances commonly be used in polyurethane foam production, for example, crosslinking agents; fillers, such as carbon black and calcium carbonate; UV-absorbers; and antioxidants, may be added as required.

Furthermore, flame retardants may also be added to render the foamed product flame retardant. The suitable flame retardants include tris(chloroethyl) phosphate, tris(2-chloroethyl) phosphate, tris(dichloropropyl) phosphate, chlorinated paraffines, tris(chloropropyl) phosphate, phosphorus-containing polyols, and brominated polyols.

The process for manufacturing the polyurethane foam sealing material of the present invention will be described below.

The sealing materials of the present invention can be prepared by the one-shot process, the prepolymer process, the partial prepolymer process, and any other processes available.

A polyol derived from a dimer acid or caster oil, caster oil or a mixture thereof (hereinafter referred to generally as an active hydrogen compound), a polyisocyanate, a surfactant, a blowing agent and a catalyst are mixed severely to achieve polymerization under foaming.

The ratio of the polyisocyanate to the active hydrogen of foaming compound (NCO/OH index) must be 0.9 or higher. If this value is lower than 0.9, the hydroxyl groups remaining in the foamed product will lower the contact angle between the polymer and water. If this value is excessively high, on the other hand, the general properties of the resultant foam will be poor. Therefore, the NCO/OH ratio is preferably within the range of 0.95 to 1.1.

It is essential to produce a foamed product having an air permeability of 10 cc/cm$^2$/sec or less for 10 mm thickness. If the air permeability exceeds this value, the waterproofness will be radically decreased.

As an example, a number of polyurethane foams with different air permeabilities were prepared from 100 parts of a polyester polyol synthesized from a dimer acid and diethylene glycol and having a hydroxyl number of 60, an acid number of 1.2 and an average number of functional groups of 2.1, 28.9 parts of tolylene diisocyanate, T-75 (a 75/25 mixture of 2,4-isomer and 2,6-isomer) in the presence of different amounts and types of silicone surfactant, amine catalyst and organic metal catalyst and water as the blowing agent. The results of water leak tests on these foamed products are as follows:

| Water pressure: 7 cm | | | | | |
|---|---|---|---|---|---|
| Air permeability cc/cm$^2$/sec | 0.2 | 2.8 | 9.5 | 28 | 50 |
| Compression ratio (%) | 75 | 75 | 75 | 75 | 75 |
| Leak time | No leak after 1 hr | 75 | 75 | Leak after 13 min | Leak after 5 min |

$$\text{Compression ratio (\%)} = \frac{\text{Sample thickness before compression} - \text{Sample thickness after compression}}{\text{Sample thickness before compression}} \times 100$$

As is apparent from the above, water leakage increases with increasing air permeability, but no leakage was observed if the air permeability was kept 10 cc/cm$^2$/sec or lower.

In the case of an asphalt-impregnated sealing material (density: 0.13 g/cm³) prepared from a conventional polyester type polyurethane foam (density: 0.035 g/cm³), leakage was observed after 15 seconds at a water pressure of 30 mm at 75% compression ratio.

The air permeability of the foamed product prepared according to the process of the present invention is determined by the type and molecular weight of active hydrogen compound, the type of diisocyanate, the type of the surfactant and catalyst, and the type and amount of blowing agent.

For example, when tolylene diisocyanate is used as the polyisocyanate, the air permeability increases as the content of 2,6-isomer increases. The air permeability increases when a tertiary amine is used as the catalyst and decreases when an organotin catalyst is employed. With N,N,NN tetraalkylalkylenediamines, the longer the alkylene chain, the lower will be the air permeability. The air permeability can also be changed greatly by the type of surfactant used.

When a lipophilic filler is to be incorporated in the foam to further enhance the waterproofing characteristics and improve its adhesion to the surface to be sealed, the filler is mixed with the foaming compound and the mixture is allowed to polymerize under foaming. In this case, the filler may either be blended, in advance, with any one of the components or may be introduced from a separate line to the mixing chamber in which the polyol and isocyanate components are finally mixed.

The reason why only the foams having an air permeability as specified above show exceptionally high waterproofness is unclear at the present. However, the following interpretation may be possible.

A flexible or semi-rigid polyurethane foam is composed of a number of fine cells connected to one another and can be regarded as an assembly of capillaries. The diameter of each cell corresponds to that of the capillary.

In general, the following relationship applies to a capillary which is in contact with water:

$$2\pi r \gamma \cos/\theta = \pi r^2 \rho g h \quad (1)$$

where r: radius of capillary, $\gamma$ = surface tension of water, $\theta$: contact angle, $\rho$: density of water, g: acceleration of gravity, h: height of elevated water From this, equation (2) can be derived.

$$h = \frac{2\gamma \cos \theta}{r\rho g} \quad (2)$$

Contact angle, $\theta$, is a measure of wettability or hydrophilicity; hence, we can find the degree of hydrophilicity of a material by measuring its contact angle with water. If $\theta$ is less than 90°, then h will be positive and water rises through the capillary. That is, such a material cannot be used as a sealing material.

If $\theta$ is larger than 90°, then h will be negative and water will be driven out of the capillary, suggesting that such a material may be employed as a sealing material. When $\theta$ is larger than 90°, the absolute value of h increases with decreasing r, the water being pushed out much the more.

In order to ascertain that this general concept may apply to actual polyurethane foam sealing materials and to find the required elements for a foam sealing material to display excellent properties the inventer carried out a number of experiments. As the result, it was demonstrated that the cell size, very diverse in both diameter and shape, can be substituted by air permeability, and that air permeability is generally lower when the cell is finer.

It was further found that if a polyurethane foam has an air permeability of 10 cc/cm²/sec or less at 10 mm thick and the contact angle of a sheet, prepared from the foam by hot pressing, with water is 90° or more, this foam material can be used as a waterproofing sealing material after cutting to a desired size, without forming any skin layer on the surface.

The air permeability referred to in the present invention is measured by the Fragier Type method for fabric air permeability testing (JIS-L-1004) at 10 mm thick. Air permeability tester No. 869 (TOYO SEIKI CO., LTD) was used as the tester.

When the sample is thinner than 10 mm, measurement may be made with a number of sheets piled up to provide a thickness of 10 mm. If the thickness is within the range between 2.5 mm and 10 mm, air permeability is approximately inversely proportional to thickness. Hence, for example, the air permeability of a sample with a thickness of 5 mm can be taken approximately as twice that with a thickness of 10 mm.

The contact angle was measured by the following method in the present invention.

A foam sample 10 mm in thickness, sandwiched between two sheets of aluminum foil, is hot-pressed at 180°-200° C. under a pressure of 40-50 Kg/cm² for one minute, released, and again hot-pressed under the same condition for one minute. The contact angle of the resultant film with water was measured using Kyowa Contact Anglemeter (KYOWA SCIENTIFIC EQUIPMENT CO. LTD.).

The water leak tests were conducted as follows: a foam, cut to a plate 98 mm long, 98 mm wide and 10 mm thick with a 68 mm square hole punched in the center, is sandwiched between two acrylic plates in close contact and held horizontal. Water is introduced to the foam sheet through the hole, prereviously punched in the upper acrylic plate under different pressures, and observed for water leakage at the outer edge ends of the sample.

Excellent waterproofness is exhibited by the polyurethane foam sealing materials of the present invention in which a hydrophobic polyol derived from a dimer acid or caster oil, castor oil or a mixture thereof is used as the active hydrogen compound and reacted with a polyisocyanate, and the air permeability is adjusted to 10 cc/cm²/sec or less for 10 mm thickness.

Table 1 below illustrates the comparison data on contact angle for polyurethane elastomers derived from conventionally used polyethers polyols and polyester polyols and those derived from the dimer acid polyols and castor oil employed in the present invention.

TABLE 1

| | Type of polyol | Type of isocyanate | Contact angle (degree) |
|---|---|---|---|
| Conventional type | Polyether A | Tolylene diisocyanate (T-80) | 81.0 |
| | Polyester B | Tolylene diisocyanate (T-80) | 81.4 |
| | Polyester C | Tolylene diisocyanate (T-80) | 82.0 |
| | Polyester D | Tolylene diisocyanate (T-80) | 82.7 |

TABLE 1-continued

| Type of polyol | | Type of isocyanate | Contact angle (degree) |
|---|---|---|---|
| This invention | Dimer acid polyol | Tolylene diisocyanate (T-80) | 101.8 |
| | Castor oil polyol | Tolylene diisocyanate (T-80) | 92.1 |

(Note)
Polyether A: Glycerol propylene oxide adduct, MW 3000
Polyester B: Polyester prepared from trimethylolpropane, diethylene glycol and adipic acid, OH value 59.5
Polyester C: Polyester prepared from 1,4-butanediol and adipic acid, OH value 55 (Nippon Polyurethane Industry Co., Ltd.)
Polyester D: Caprolactone polyester, OH value 55 (Dainippon Ink and Chemical Co., Ltd.)
Dimer acid polyol: Polyester polyol prepared from dimer acid and ethylene glycol, OH value 58.0 acid value 0.2
Castor oil polyol: Castor oil, OH value 162, iodine value 85

As is apparent from the above, the polyols used in the present invention have larger contact angles, and the polyurethane elastomers derived therefrom, unlike those derived from conventional polyols, show a contact angle of 90° or more and are hydrophobic in nature.

A number of polyurethane foams were then prepared from the same isocyanate and polyol components as above using different amounts of water as the blowing agent. The contact angle and water leakage measurements for these samples are shown in Table 2.

TABLE 2

| | Type of Polyol | Parts of water added to 100 parts of polyol | Type of isocyanate | Type of silicone | Foam condition | Contact angle | Water-proofness |
|---|---|---|---|---|---|---|---|
| Conventional type | Polyether A | 2.3 | Tolylene diisocyanate (T-80) | A | Excellent | 61.0 | Very poor |
| | Polyether A | 2.3 | Tolylene diisocyanate (T-80) | B | Good | 89.9 | Poor |
| | Polyether A | 2.3 | Tolylene diisocyanate (T-80) | C | Poor (coarse cell) | 90.3 | Very poor |
| | Polyether A | 3.0 | Tolylene diisocyanate (T-80) | A | Excellent | 58.3 | Very poor |
| | Polyether B | 2.3 | Tolylene diisocyanate (T-65) | A | Good | 67.5 | Very poor |
| | Polyether B | 2.3 | Tolylene diisocyanate (T-65) | B | Good | 87.4 | Poor |
| | Polyether B | 3.0 | Tolylene diisocyanate (T-65) | A | Good | 66.4 | Poor |
| | Polyether C | 2.0 | Tolylene diisocyanate (T-65) | A | Good | 70.6 | Poor |
| This invention | Dimer acid polyol | 2.2 | Tolylene diisocyanate (T-65) | A | Good | 82.6 | Good |
| | Dimer acid polyol | 2.2 | Tolylene diisocyanate (T-65) | B | Good | 95.6 | Excellent |
| | Dimer acid polyol | 2.2 | Toylene diisocyanate (T-65) | C | Good | 98.9 | Excellent |
| | Dimer acid polyol | 4.0 | Tolylene diisocyanate (T-65) | B | Good | 90.4 | Excellent |
| | Castor oil polyol | 3.0 | Tolylene diisocyanate (T-65) | B | Good | 90.1 | Excellent |
| | Castor oil polyol | 3.0 | Tolylene diisocyanate (T-65) | C | Good | 92.7 | Excellent |
| | Dimer acid polyol + lipophilic filler | 2.3 | Tolylene diisocyanate (T-65) | A | Good | 91.8 | Excellent |
| | Polyether A + lipophilic filler | 2.3 | Tolylene diisocyanate | B | Good | 89.2 | Poor |

TABLE 2-continued

| Type of Polyol | Parts of water added to 100 parts of polyol | Type of isocyanate | Type of silicone | Foam condition | Contact angle | Water-proofness |
|---|---|---|---|---|---|---|
| | | (T-65) | | | | |

Note 1 Silicone surfactants
A: Acetylated oraganosilicon compound, Toray Silicone SH-190 (TORAY-Silicone Co. Ltd.)
B: Hydroxyl-bearing organosiloxane compound

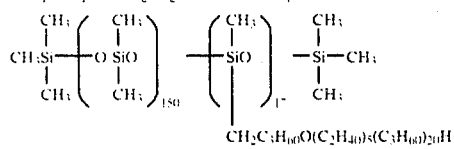

$CH_3C_3H_{60}O(C_2H_{40})_5(C_3H_{60})_{20}H$

C: Polydimethylsiloxane, (20 centistokes)
Note 2 Polyols are the same as in Table 1.
Fifty parts, by weight, of petroleum resin (a 2:1 mixture of FTR ®️ (Mitsui Petrochemical Company, Limited) and Hizol SAS.1.H (Nippon Petrochemicals Company, Limited) was used as the lipophilic filler.
Note 3 Waterproofness was rated as follows:
Excellent: no leak at 7 cm pressure after 5 hours (75% compression)
Good: no leak at 3 cm pressure after 5 hours (75% compression)
Poor: leak at 3 cm pressure within 5 hours (75% compression)
Very poor: leak at 1 cm pressure within 10 minutes (75% compression)

Compression Ratio = $\frac{\text{Thickness before compression} - \text{Thickness after compression}}{\text{Thickness before compression}} \times 100$ From the results given in the above table, it is apparent that, even with the urea groups introduced in the polymer chain by the use of water as the blowing agent, the polyurethane foam sealing materials of the present invention show very high contact angle and exhibit higher waterproofness than conventional ones incorporating lipophilic filler.

In the case where the hydrophilic polyols commonly used in conventional polyurethane foams are employed, even when a waterproofing filler and a hydroxyl-containing silicone surfactant, as used in the present invention, are formulated, satisfactory waterproofness sufficient for actual application cannot be obtained, although the contact angle is increased. This is presumably because, even with the initial high contact angle, the hydrophilic polyol chain contained in the polymer gradually absorbs water during contact with water, with the resultant decrease in contact angle.

On the other hand, when the polyols as defined in the present invention are used, formulation of a silicone surfactant commonly used in conventional polyurethane foams results in poor waterproofness; however, even in this case, the materials show waterproofing characteristics sufficient for actual use at water pressures of 3 cm or lower.

Combination of a hydrophobic polyol and a hydroxyl-containing silicone surfactant apparently exhibits the highest waterproofness, and further formulation of a lipophilic filler offers more enhanced waterproofness as well as improved adhesion of the sealing material to the surfaces to be sealed.

Thus, the polyurethane foam sealing material of the present invention has low temperature sensitivity that is little change in stiffness even in summer, shows little change in stiffness depending on compression ratio, and is easy to handle without causing any contamination to the substrates to which it is applied. The manufacturing method is also easy; the lipophilic filler, if desired, can be incorporated in the product simply by formulating it in the foaming compound, eliminating the troublesome after-treatments required in conventional processes, such as subsequent impregnation of waterproofing fillers, or subsequent lamination or formation of a film on the product surface. Any desired shape can be easily obtained by cutting the foamed product. Furthermore, the incorporation of a lipophilic filler imparts the foamed product with better adhesion to the substrates and improved softness and lessen the hydrolysis rate of ester bond in polyurethane polymer. These are excellent features not expected in conventional sealing foam, that is impregnated with waterproofing filler.

The sealing materials of the present invention are suitable for use in the fender, ventilator, air conditioning joints and other parts in automobiles, as well as in ships, refrigerators and other assembly products.

These products are composed and assembled of a number of components, in which a minute dimensional error of each component may lead to a large error in total. The cavities to be sealed in such assembly products vary largely in size for individual articles, to which undeformable sealing materials are not adaptable. If such undeformable materials are to be used, parts and members with extremely high accuracy must be employed. However, mass production of such parts and members is very difficult.

Therefore, it is impossible for the sealing materials which cannot be deformed freely in response to variations in cavities to ensure satisfactory sealing in all mass-produced articles.

The present invention will be more fully understood from the following examples.

EXAMPLES 1-6

Open-cell, polyurethane foams having an air permeability of 2.1 cc/cm²/sec for 10 mm thickness were prepared from 100 parts of a polyester polyol, synthesized from dimer acid and diethylene glycol and having a hydroxyl number of 60, an acid number of 1.2 and an average functionality of 2.1, 28.9 parts of tolylene diisocyanate T-75 (a 75/25 mixture of 2,4- and 2,6 isomers), 2.0 parts of water adequate amounts of triethylenediamine (Dabco-33LV) and stannous octoate, 0.7 part of a foam stabilizer, and 30 parts of a waterproofing filler. The waterproofing characteristics of the foams obtained are illustrated below.

| | Structure of silicone surfactant | | | | | |
|---|---|---|---|---|---|---|
| | Polyether | | | Siloxane | | |
| | a/b (molar ratio) | MW | R | m 33 | n 3 | Filler |
| Example 1 | 80/20 | 1700 | H | 33 | 3 | No |
| 2 | 80/20 | 2000 | $C_4H_9$ | 33 | 3 | No |
| 3 | 80/20 | 1700 | H | 33 | 3 | Yes |
| 4 | 80/20 | 2000 | $C_4H_9$ | 33 | 3 | Yes |
| 5 | | Poly-dimethyl-siloxane | | 20 | cst | No |
| 6 | | Poly-dimethyl-siloxane | | 20 | cst | Yes |

(Note)
The filler used is a 1:1 mixture of Mitsui FTR (MITSUI PETROCHEMICAL CO. LTD.) and liquid paraffin. The polyether-grafted silicone surfactant used has the following structure:

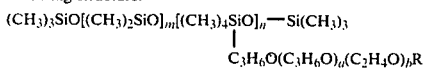

| | Density g/cm³ | Air permeability cc/cm²/sec | Waterproofness at 75% compression | |
|---|---|---|---|---|
| | | | 7cm pressure Leak start time | 3cm pressure Leak start time |
| Ex. 1 | 0.049 | 1.1 | No leak after 24 hours | No leak after 24 hours |
| Ex. 2 | 0.050 | 0.7 | 2 hours | No leak after 24 hours |
| Ex. 3 | 0.058 | 2.1 | No leak after 24 hours | No leak after 24 hours |
| Ex. 4 | 0.060 | 0.9 | 13 hours | No leak after 24 hours |
| Ex. 5 | 0.048 | 1.5 | No leak after 24 hours | No leak after 24 hours |
| Ex. 6 | 0.061 | 1.7 | No leak after 24 hours | No leak after 24 hours |

No water leakage was observed in the foam of Example 3 after one month at a water pressure of 10 cm and 10% compression.

EXAMPLE 7

Polyurethane foams with different air permeabilities were prepared from 100 parts of a polyol, synthesized from dimer acid and a low molecular glycol and having an acid number of 0.4, a hydroxyl number of 80 and an average functionality of 2.2, 34.3 parts of tolylene diisocyanate T-65 (a 65/35 mixture of 2,4- and 2,6-isomers), 2.2 parts of water, 1.0 part of the silicone surfactant used in Example 2 above, 30 parts of straight asphalt as the waterproofing filler, and adequate amounts of triethylenediamine, stannous octoate and N-ethylmorpholine. The relation of air permeability versus waterproofness was as follows:

| Ex. Sample No. | Density | Air permeability | Leak start time at 10 cm water pressure and 50% compression |
|---|---|---|---|
| 7-1 | 0.052 | 0.4 | More than 24 hours |
| 7-2 | 0.056 | 3.8 | More than 24 hours |
| 7-3 | 0.058 | 12.5 | 6 hours |
| 7-4 | 0.060 | 25.0 | 8.5 minutes |

No water leakage was observed in Ex. sample No. 7-1 even at 10% compression and in Ex. sample No. 7-2 even at 30% compression.

EXAMPLE 8

A polyurethane foam was prepared from 100 parts of purified castor oil (hydroxyl number, 162), 2.0 parts of water, 0.2 part of triethylenediamine, 44.5 parts of tolylene diisocyanate T-80 (a 80/20 mixture of 2,4- and 2,6-isomer), 1.0 part of a silicone surfactant of the following formula, and 2.0 parts of Freon-11. After slight crushing, the foam showed a density of 0.065 g/cm³ and an air permeability of 1.7 cc/cm²/sec.

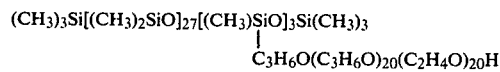

No water leakage was observed when tested by the method described above at a water pressure of 50 mm or less and a compression rate of 75%.

EXAMPLE 9

Castor oil was placed in a 4-necked flask equipped with a stirrer, a thermometer, a reflux condenser, and a dropping funnel. Propylene oxide was added to the castor oil in the presence of KOH as the catalyst at 120° C. while introducing nitrogen gas, giving a castor oil propylene oxide adduct having a hydroxyl number of 78 and an acid number of 1.1.

Polyurethane foams were prepared using 100 parts of this polyol, 50 parts of petroleum resin, Hisol SAS-LH (NIPPON PETROCHEMICAL CO. LTD.), 50 parts of petroleum resin, Neopolymer-S (softening point 90°–95° C., NIPPON PTEROCHEMICAL CO. LTD.), 2.7 parts of water, 62.1 parts of polymethylenepolyphenylene polyisocyanate MDI-CR (MITSUI-NISSO URETHAN CO. LTD.), and silicone surfactants used in Examples 2 and 8. The properties of the foamed products thus obtained were as follows:

| Type of silicone used | Density | Air Permeability | Water leak at 7 cm pressure and 75% compression |
|---|---|---|---|
| Same as Ex. 2 | 0.089 | 1.1 | No leak after 24 hours |
| Same as Ex. 8 | 0.084 | 0.9 | No leak after 24 hours |

EXAMPLE 10

Polyurethane foams were prepared using a dimer acid propylene oxide adduct (hydroxyl number 73.4, acid number 1.47) and polypropylene triol (MW 3000, hydroxyl number 56.1) as the polyol, Neopolymer-S and Highsol SUS-LH as the hydrocarbon oil, polymethylenepolyphenylene polyisocyanate, MDI-CR as the isocyanate, and water as the blowing agent as an NCO/OH ratio of 1.02. The results are shown in Table 5.

| | | | |
|---|---|---|---|
| Dimer acid propylene (part) oxide adduct | 100 | 100 | 50 |
| Polypropylene triol (part) | — | — | 50 |
| Neopolymer-S (part) | 75 | 100 | 75 |
| Highsol SAS-LH (part) | 75 | 100 | 75 |
| Water (part) | 3 | 3 | 3 |
| Silicone surfactant (part) | 1 | 1 | 1 |
| Dabco-33LV (part) (triethylenediamine) | 1.0 | 1.2 | 1.0 |
| DBTDL (part) (dibutyltin dilaurate) | 0.2 | 0.3 | 0.3 |
| Density (g/cm$^3$) | 0.085 | 0.105 | 0.091 |
| Tensile strength (Kg/cm$^2$) | 1.38 | 1.30 | 1.00 |
| Air permeability (cc/cm$^2$/sec) | 5.0 | 4.2 | 9.6 |
| Water leakage 5 cm water pressure, 75% compression | No leak after 24 hours | | |

(Note)
The silicone surfactant is the same as Ex. 8.

EXAMPLES 11–16

Open-cell polyurethane foams having an air permeability of 1.7 cc/cm$^2$/sec were prepared from 100 parts of a polyester polyol, synthesized from dimer acid and diethylene glycol and having a hydroxyl number of 60, an acid number of 1.2 and an average number of functional groups of 2.1, 49.6 parts of polymethylene polyphenylene polyisocyanate, MDI-CR, 2.2 parts of water, different amounts of triethylenediamine (Dabco-33LV) and stannous octoate, 1.0 part of a foam stabilizer, and 30 parts of a waterproofing filler. The results are illustrated below.

| | | Structure of silicone surfactant | | | | |
|---|---|---|---|---|---|---|
| | | Polyether | | Siloxane | | (Petroleum resin |
| | a/b | MW | R | m | n | from C$_8$-cut) |
| Example 11 | 1 | 2000 | H | 150 | 15 | No |
| 12 | 4 | 2000 | C$_4$H$_9$ | 27 | 3 | No |
| 13 | 1 | 2000 | H | 150 | 15 | Yes |
| 14 | 4 | 2000 | C$_4$H$_9$ | 27 | 3 | Yes |
| 15 | | Polydimethylsiloxane | | 20 | cst | No |
| 16 | | Polydimethylsiloxane | | 20 | cst | Yes |

The polyether-grafted silicone surfactant used has the following structure:

$$(CH_3)_3SiO[(CH_3)_2SiO]_m[(CH_3)SiO]_nSi(CH_3)$$
$$|$$
$$C_3H_6O(C_3H_6O)_a(C_2H_4O)_bR$$

| | | Waterproofness at 75% compression | |
|---|---|---|---|
| | Density g/cm$^3$ | Air permeability cc/cm$^2$/sec | Leak start time at 10 cm water pressure | Leak start time at 7 cm water pressure |
| Ex. 11 | 0.056 | 0.3 | >24 hours | >24 hours |
| 12 | 0.053 | 0.6 | 5 hours | >24 hours |
| 13 | 0.060 | 0.8 | >24 hours | " |
| 14 | 0.059 | 0.3 | 22 hours | >24 hours |
| 15 | 0.054 | 1.1 | >24 hours | " |
| 16 | 0.062 | 0.8 | " | " |

EXAMPLE 17

A polyurethane foam was prepared in the same way as Example 8 except that polymethylene polyphenylene polyisocyanate was used instead of tolylene diisocyanate. The foam obtained has an air permeability of 0.4 cc/cm$^2$/sec and showed no water leak at water pressure of 10 cm and compression rate of 50%.

EXAMPLE 18

A polyurethane foam was prepared from 100 parts of a dimer acid propylene oxide adduct (hydroxyl number 73.4, acid number 1.47), 100 parts of petroleum resin (Neopolymer-S), 31.3 parts of tolylene diisocyanate T-65, 2.0 parts of water, 1.0 part of silicone surfactant (same as Example 8), 0.6 part of Dabco 33LV, and 0.3 part of dibutyltin dilaurate. The foam thus obtained has a density of 0.107 and an air permeability of 5.5 cc/cm$^2$/sec, and showed no water leak at a water pressure of 3 cm and a compression rate of 75%.

EXAMPLE 19

Water absorption measurements were conducted according to the method specified in ASTM-994-53 with the foams obtained in Examples 1–6. Each foam was cut to a size of 30 mm×30 mm×100 mm, and the rectangle sides were sandwiched and compressed between two metal plates and immersed in water 100 mm below the surface. It was then taken out, released from the metal plates, wiped with a gauze to remove the water droplets attaching to the surfaces, and measured for water absorption according to the following equation. Similar experiments were carried out for the foams prepared in comparative examples 1–4 stated below.

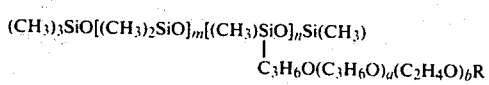

The results are shown in the table below.

| | | Examples | | | | | | Comparative examples | | | |
|---|---|---|---|---|---|---|---|---|---|---|---|
| Sample | | 1 | 2 | 3 | 4 | 5 | 6 | 1 | 2 | 3 | 4 |
| Compression rate Nater absorption | 50% | 4.9 | 10.9 | 3.1 | 8.4 | 5.0 | 4.1 | 1140 | 952 | 192 | 317 |
| | 75% | 2.1 | 7.8 | 1.3 | 5.6 | 2.0 | 1.5 | 510 | 455 | 187 | 269 |

COMPARATIVE EXAMPLE 1

A polyurethane foam was prepared from 100 parts of a polyether polyol, synthesized by addition of propylene oxide to glycerol and having a molecular weight of 3000, 3 parts of water, 1.0 part of silicone surfactant, SH-190 (TORAY SILICONE), 0.2 part of triethylenediamine, 0.3 part of stannous octoate, and tolylene diisocyanate (NCO/OH ratio=1.02). The foam obtained has a density of 0.032 g/cm³ and an air permeability of 50 cc/cm²/sec.

Leak start time and amount of leak were measured according to the method in Example 1. The results are illustrated in the table below.

| Compression rate (%) | | 70 | 82.5 | 85 | 87.5 | 92.5 | 94 | 95 |
|---|---|---|---|---|---|---|---|---|
| Density after compression (g/cm³) | | 0.1 | 0.18 | 0.2 | 0.26 | 0.4 | 0.53 | 0.64 |
| 100 mm water pressure | Amount of leak (g/min) | 210 | 60 | 23 | 10 | 0.8 | 0.13 | 0.05 |
| | Leak start time | 2 sec | 7 sec | 13 sec | 20 sec | 70 sec | 6 min | 16 min |
| 10 mm water pressure | Amount of leak (g/min) | 35 | 16 | 5 | 1.5 | 0.15 | 0.03 | trace |
| | Leak start time | 15 sec | 50 sec | 90 sec | 3 min | 8 min | 31 min | 210 min |

As apparent from the above, water leakage could not be prevented even at higher compression rate.

COMPARATIVE EXAMPLE 2

A polyurethane foam was prepared in the same way as Comparative example 1 except that water was used in an amount of 2.5 parts. The foam obtained has a density of 0.040 g/cm³ and an air permeability of 20 cc/cm²/sec. The results of water leak tests were as follows.

| Compression rate (%) | 75 | 82.5 | 85 | 87.5 | 90 | 92.5 | 95 |
|---|---|---|---|---|---|---|---|
| Density after compression (g/cm) | 0.16 | 0.22 | 0.26 | 0.32 | 0.4 | 0.53 | 0.8 |
| Amount of leak (g/min) | 60 | 10 | 4 | 1.7 | 0.1 | 0.04 | Trace |
| Leak start time | 7 sec | 20 sec | 25 sec | 45 sec | 3 min | 120 min | 180 min |

As apparent from the above results, water leakage could not be prevented even at higher compression rates.

COMPARATIVE EXAMPLE 3

A polyurethane foam was prepared by the conventional method using a polyester polyol, synthesized for trimethylol propane, ethylene glycol and adipic acid, and tolylene diisocyanate T-65 (a 65/35 mixture of 2,4- and 2,6-isomers). The foam obtained has a density of 0.028 g/cm³ and an air permeability of 5 cc/cm²/sec.

| Compression rate (%) | 70 | 75 | 85 | 92.5 | 94 |
|---|---|---|---|---|---|
| Density after compression (g/cm) | 0.09 | 0.11 | 0.19 | 0.372 | 0.46 |
| Amount of leak (g/min) | 25 | 16 | 3.6 | 0.13 | 0.02 |
| Leak start time | 7 sec | 20 sec | 40 sec | 5 min | 15 min |

As is apparent from the above results, water leakage could not be prevented even with extremely low air permeability at high compression rate.

COMPARATIVE EXAMPLE 4

A polyurethane foam was prepared from 20 parts of a sorbitol-derived polyol (SP-750, SANYO KASEI), 80 parts of a glycerol-derived polyol (molecular weight, 3000), 1.0 part of silicone foam stabilizer, 25 parts of Freon-11, 20 parts of polybutene, 0.07 part of triethylenediamine, 0.5 part of stannous octoate, and tolylene diisocyanate at NCO/OH ratio of less than 1.00. The foam obtained has a density of 0.067 g/cm³ and air permeability of 1.25 cc/cm²/sec.

This foam was subjected to the U-shape water leak test.

Specimen: the foam is cut to a size of 10 mm×10 mm×300 mm and shaped into a U-shape.

This was held between two sheets of acrylic plate with a spacer (1.5 mm thick) inserted, and compressed to a compression rate of 85%. A water pressure of 100 mm was applied at one end of the specimen. Water was observed to leak out of the other end after 31 minutes by capillary action.

Similar test were carried out with the samples obtained in Examples 1–6. No water leaks were found at all in these cases.

What we claim is:

1. A flexible open-cell, polyurethane foam sealing material prepared from a polyisocyanate and a polyol component a major portion of which consists of (1) a polyol derived from a dimer acid having a number average molecular weight of 600 to 5000 and an average functionality of 1.6 to 4.0, or (2) castor oil or a polyol derived from castor oil having a number average molecular weight of 600 to 5000 and an average functionality of 3 to 4, or a mixture thereof in the presence of a blowing agent, a surfactant and a catalyst and having an air permeability of 10 cc/cm2/sec or less at a thickness of 10 mm.

2. A flexible open-cell, polyurethane foam sealing material prepared from a polyisocyanate and a polyol component a major portion of which consists of (1) a polyol derived from a dimer acid having a number average molecular weight of 600 to 5000 and an average functionality of 1.6 to 4.0, or (2) castor oil or a polyol derived from castor oil having a number average molecular weight of 600 to 5000 and an average functionality of 3 to 4, or a mixture thereof in the presence of a lipophilic filler, a blowing agent, a surfactant, and a catalyst and having an air permeability of 10 cc/cm²/sec or less at a thickness of 10 mm.

3. A polyurethane foam sealing material as set forth in claim 1 or 2, wherein the surfactant is an organosilicon compound.

4. A polyurethane foam sealing material as set forth in claim 3, wherein the organosilicon compound is a compound having an active hydrogen radical or active hydrogen radicals.

5. A polyurethane foam sealing material as set forth in claim 4, wherein the organosilicone compound is, polydimethyl-siloxane-polyalkyleneglycol block copolymer having active hydrogen radicals.

6. A polyurethane foam sealing material as set forth in claim 3, wherein the organosilicon compound is a silicone oil represented by the following formula:

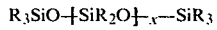

$$R_3SiO\text{---}[SiR_2O]_x\text{---}SiR_3$$

in which R is an alkyl group such as methyl, ethyl and butyl or an aryl group such as phenyl, and X is an integer of 0 or a positive integer.

7. A polyurethane foam sealing material as set forth in claim 2, wherein the lipophilic filler is a hydrocarbon, a dicarboxylic acid diester, or an animal or vegetable oil, and said lipophilic filler has a melting or softening point of 150° C. or lower and a boiling point of 200° C. or higher at atmospheric pressure.

8. A polyurethane foam sealing material as set forth in claim 2, wherein the lipophilic filler is coal tar, asphalt, or a petroleum resin prepared by polymerizing a $C_4$–$C_9$ fraction obtained as a byproduct in naphtha cracking.

9. A process for producing a polyurethane foam sealing material which comprises reacting a polyisocyanate and a polyol component a major portion of which consists of (1) a polyol derived from a dimer acid having a number average molecular weight of 600 to 5000 and an average functionality of 1.6 to 4.0 or (2) castor oil or a polyol derived from castor oil having a number average molecular weight of 600 to 5000 and an average functionality of 3 to 4, or a mixture thereof in the presence of a blowing agent, a surfactant, and a catalyst under such a condition as to provide a polyurethane foam having an air permeability of 10 cc/cm$^2$/sec or less at a thickness of 10 mm.

10. A process for producing a polyurethane foam sealing material as set forth in claim 9, wherein a lipophilic filler is formulated in the foaming compound.

11. A polyurethane foam sealing material as set forth in claim 4, wherein the polydimethyl siloxane-polyalkyleneglycol block copolymer having active hydrogen radicals is represented by the following formula:

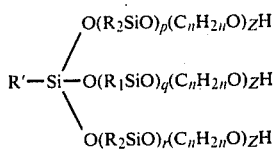

wherein R and R' are alkyl radicals having a carbon number of 1 to 4, and n is an integer of 2 to 4, and p, q, r and Z denote integers, and

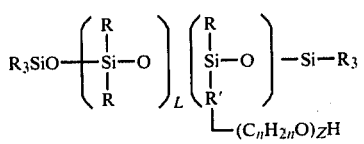

wherein R represents alkyl radicals having a carbon number of 1 to 4, R' is a divalent organic radical, and n denotes an integer of 2 to 4, and L, m, and Z denote integers.

* * * * *